United States Patent [19]

Veronesi et al.

[11] Patent Number: 5,613,634
[45] Date of Patent: Mar. 25, 1997

[54] PASSIVELY AMBIENT TEMPERATURE ACTUATED FLUID VALVE

[75] Inventors: Luciano Veronesi, Blawnox/O'Hara Township; Ian L. W. Wilson, Murrysville, both of Pa.

[73] Assignee: Westinghouse Electric Corporation, Pittsburgh, Pa.

[21] Appl. No.: 328,188

[22] Filed: Oct. 24, 1994

[51] Int. Cl.$^6$ .................................................. G05D 23/02
[52] U.S. Cl. ........................................ 236/101 R; 236/102
[58] Field of Search ................................ 236/101 R, 102

[56] References Cited

U.S. PATENT DOCUMENTS

| | | |
|---|---|---|
| 1,047,769 | 12/1912 | East et al. . |
| 3,121,331 | 2/1964 | Von Platen ........................ 236/101 R |
| 3,455,640 | 7/1969 | White ................................ 236/101 R |
| 3,594,675 | 7/1971 | Wilson ................................... 337/140 |
| 3,833,171 | 9/1974 | Gifford .................................... 236/102 |
| 4,451,002 | 5/1984 | Klee et al. ......................... 236/101 R |
| 4,523,605 | 6/1985 | Ohkata ...................................... 137/62 |
| 4,570,851 | 2/1986 | Cirillo ...................................... 236/93 |
| 4,836,443 | 6/1989 | Wolters et al. ........................... 236/92 |
| 4,848,388 | 7/1989 | Waldbusser ............................. 137/80 |
| 5,141,153 | 8/1992 | Jeffress ..................................... 236/93 |
| 5,261,597 | 11/1993 | Perlman et al. ......................... 236/93 |

FOREIGN PATENT DOCUMENTS

| | | |
|---|---|---|
| 0018065 | 10/1980 | European Pat. Off. . |
| 0163400 | 12/1985 | European Pat. Off. . |
| 9322591 | 11/1993 | WIPO . |

OTHER PUBLICATIONS

*Chem Matters*, Oct. 1993; vol. 11, No. 3, pp. 3–7.
Raychem Corporation; *Thermal Actuation with Shape Memory Alloys*, by Dieter Stoeckel; pp. 1–11.

*Primary Examiner*—William E. Tapolcai

[57] ABSTRACT

A passively temperature actuated valve has a shape memory alloy (SMA) mechanism connected to a lever arm which engages the valve stem to actuate the valve against the biasing force of a valve stem biasing spring when the ambient temperature rises above the transition temperature of the SMA. The SMA mechanism can include an SMA rod, but preferably has a tube of shape memory alloy supported in couplings which allow ambient fluid to freely pass through the tube. A stack of Bellville springs concentrically mounted over the tube biases the tribe to the elongated condition when below the transition temperature. An optional latch latches the valve in the actuated position if it is required that the valve remain actuated when the ambient temperature falls below the transition temperature and the Bellville springs again elongate the SMA member.

15 Claims, 6 Drawing Sheets

PASSIVELY AMBIENT TEMPERATURE ACTUATED FLUID VALVE

BACKGROUND OF THE INVENTION

1. Field of the Invention

This invention relates to valves passively actuated by shape memory alloy elements in response to temperature conditions, and particularly to such valves which respond to ambient temperature conditions rather than to the temperature of the fluid passing through the valves.

2. Background Information

Shape memory alloys possess interesting and potentially useful properties. These alloys undergo a crystalline phase change known as thermoelastic martensitic transformation. Below the transformation temperature these alloys are martensitic and can be rather easily deformed. When heated above the transformation temperature the original shape is restored and the material is converted to its high strength, austenitic condition. The transformation occurs rapidly at the critical temperature and develops considerable stress.

Shape memory alloys have been utilized in various actuating devices. For instance, they have been used to make springs responsive to fluid temperature to operate valves controlling flow of the fluid. They have also been used as beams which bend to actuate switches at certain temperatures, and to operate vents in greenhouses in response to temperature. Among other uses of shape memory alloys are temperature operated tweezers, flappers for fluid valves, and valves in automatic transmissions.

There are applications, such as for instance a nuclear reactor installation, for passively temperature activated valves which respond to ambient temperature conditions, rather than the temperature of the fluid controlled by the valve. These valves can be quite large and require a commensurate stroke. In some applications, the valves must be positively retained in a fully closed or fully opened position under normal conditions for reliability and safety. Often this is achieved by the use of large biasing springs which increase the force required to operate such valves. In many instances, the valve must be positively maintained in the operated condition.

There is, therefore, a need for a passively temperature actuated valve responsive to ambient temperature conditions.

This includes the need for such a passively ambient temperature actuated valve which can develop the force and stroke needed to operate sizable valves such as those used in nuclear reactor systems.

There is also a need for such a valve which once actuated in response to a rise in temperature above a predetermined temperature, remains actuated even though the temperature later falls below the predetermined temperature.

SUMMARY OF THE INVENTION

These needs and others are satisfied by the invention which is directed to a passively temperature actuated fluid valve having shape memory alloy (SMA) means for passively actuating the valve in response to ambient temperature conditions. As used throughout, ambient temperature is the temperature of the medium in which the valve is immersed. This includes atmospheric temperature when the valve is exposed to the atmosphere. It also includes the temperature of a gas or liquid surrounding the valve when placed in a tank or enclosure. It does not embrace the temperature of the fluid which is being controlled by the valve.

The passively temperature actuated valve of the invention is actuated in response to an ambient temperature above the transformation temperature of the SMA means. The valve can include latching means latching the valve in the activated position so that even if the temperature falls below the transformation temperature, the valve remains activated.

More particularly, the valve in accordance with the invention includes a valve stem which operates the valve between first and second positions, one of which is the closed position and the other the open position. Valve stem biasing means biases the valve to the first position. The SMA means comprises an SMA element coupled to the valve stem and having a transformation temperature above which the SMA element applies a force to the valve stem to operate the valve to the second position, with the SMA element responding to the ambient containment temperature.

Preferably, the SMA element comprises an elongated SMA member having a first length when below the transformation temperature and a second, shorter length when above the transformation temperature. The elongated SMA member is coupled to the valve stem by a lever which is pivoted about a pivot axis as the elongated SMA member transitions between the first length and the second length. Preferably, the lever engages the valve stem through a lost motion connection which may take the form of a shoulder on the stem and a space between the lever and the shoulder when the elongated SMA member is below the transformation temperature. This permits the stem biasing means, such as a compression spring, to seat the valve firmly to maintain it in the closed position.

The elongated SMA member is supported by mounting means affixed to the valve, preferably with the elongated SMA member generally parallel to the valve stem. Also preferably, the mounting means includes thermal insulating means between the housing and the elongated SMA member so that the elongated SMA member responds to the ambient temperature and is not affected by the temperature of the fluid controlled by the valve.

A biasing member in the form of a spring biases the elongated SMA member to the first length which is set by a stop to preclude stretching the elongated SMA member beyond its elastic limit. This elongated SMA member is preferably tubular but can also be a rod. The biasing spring is an annular compression spring such as a stack of Bellville springs which is mounted concentric with the elongated SMA member and applies a tensile force to opposite ends of the elongated SMA member.

In the context of general application, the passively temperature actuated valve of the invention comprises a valve housing, a valve stem extending from the housing for operating the valve between a first position and a second position, valve biasing means biasing the valve to the first position, and passive actuation means comprising an elongated SMA member having a first length when below a transformation temperature and a second length when above the transformation temperature. Mounting means mounts the elongated SMA member generally parallel to the valve stem and a lever pivoted about an axis generally transverse to the valve stem and engaging the valve stem operates the valve from the first position to the second position as the elongated SMA member changes length from the first length to the second length as the ambient temperature exceeds the transformation temperature. The SMA member biasing means biases the elongated SMA member to the first length where needed. Latch means latches the valve stem in the second position when the transformation temperature is exceeded.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

The invention will be described as applied to a globe valve which may be used, for instance, in a nuclear power plant. However, it will become apparent to those skilled in the art that the invention has application to other types of valves utilized in the same or other types of installations.

Figure 1:
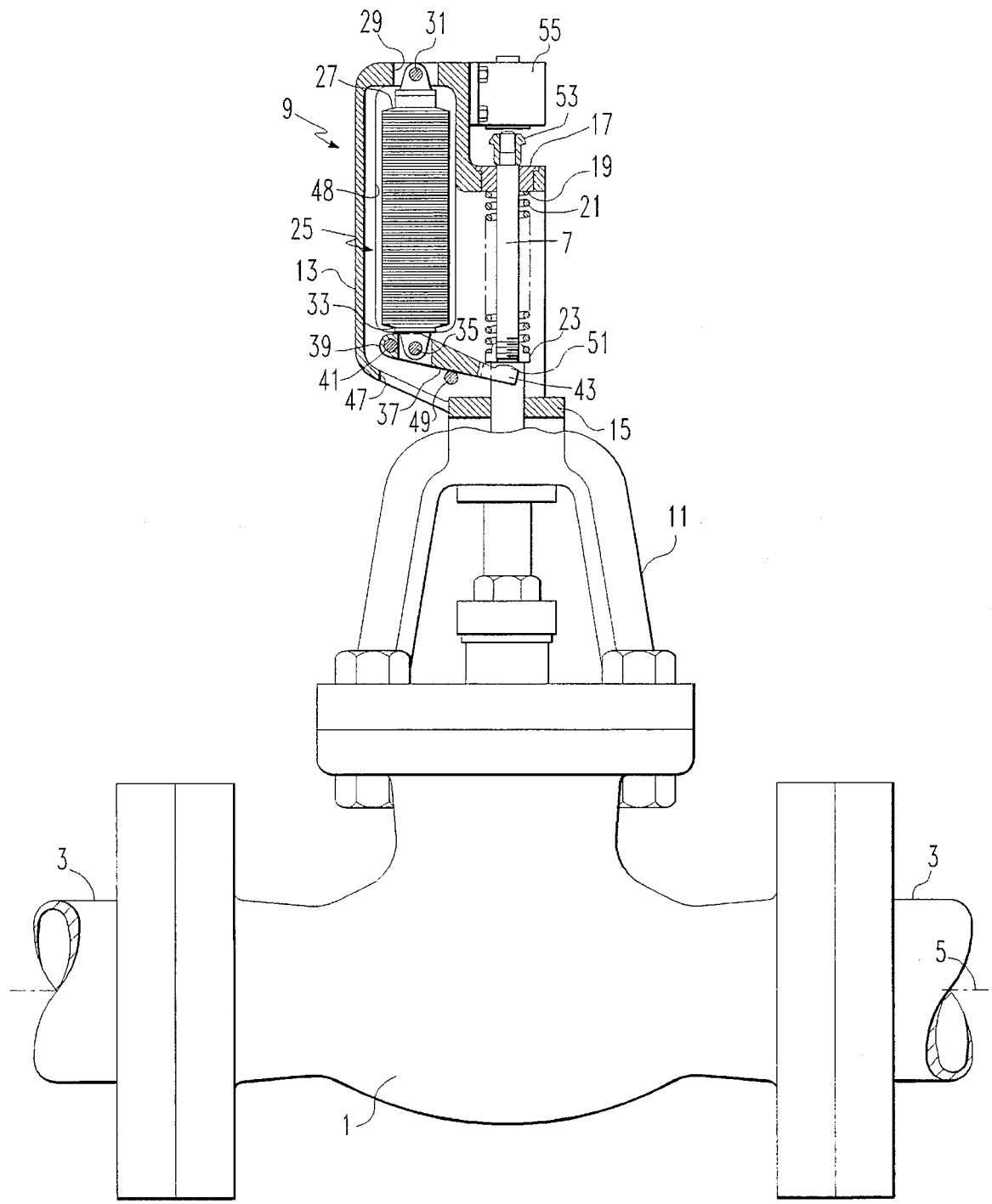
FIG. 1 is a side elevation view of a closed valve to which the invention, shown partially in vertical section, has been applied.

As shown in FIG. 1, the valve 1 is connected to pipe sections 3 in a fluid line 5. The valve I has a valve stem 7 which is raised to open the valve and lowered to close the valve.

Figure 1A:
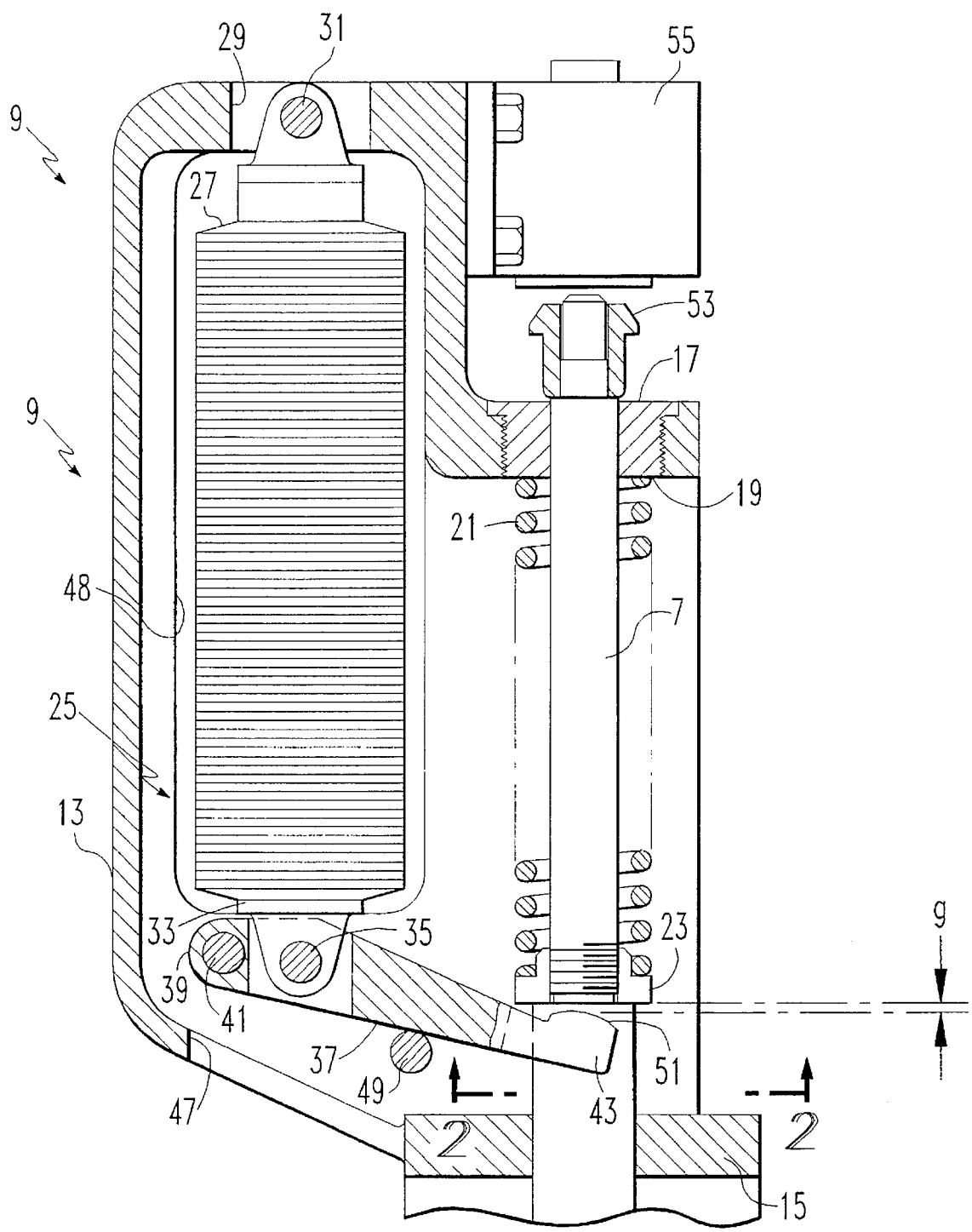
FIG. 1A is a view in enlarged scale of a portion of FIG. 1.

The invention comprises a shape memory alloy (SMA) actuator 9 shown in greater detail in FIG. 1A which is secured to a yoke 11 through which the valve stem 7 extends. The SMA actuator 9 includes a housing 13 mounted to the yoke 11. As it is an object of the invention that the SMA actuator 9 respond to ambient temperature conditions and not the temperature of the fluid controlled by the valve 1, the housing can be isolated from the valve 1 by an insulator 15.

A bushing 17 as screwed into the housing 13 serves as an upper guide for the valve stem 7 and forms a shoulder 19 against which the upper end of a helical compression spring 21 bears. The lower end of the spring 21 engages a collar 23 on the valve stem to bias the valve stem downward to the closed position.

Figure 2:
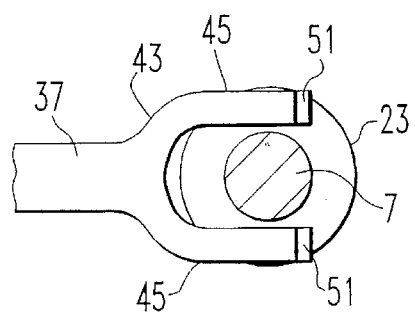
FIG. 2 is a horizontal fragmentary cross-section through the apparatus of FIG. 1A taken along the line 2—2.

An SMA mechanism 25 is mounted in the housing 13 alongside the valve stem 7. This SMA mechanism is pivotally connected at its upper end 27 in an upper opening 29 in the housing 13 by pivot pin 31. The lower end 33 of the SMA mechanism 25 is pivotally connected by a pin 35 to a lever arm 37. The lever arm 37 is pivotally connected at one end 39 to the housing 13 by pivot pin 41. As shown in FIG. 2, the free end 43 of the lever arm 37 is bifurcated to form a pair of legs 45 which straddle the valve stem 7.

The SMA mechanism 25, which will be described in detail, has a first longer length when the ambient temperature is below the transition temperature of the SMA mechanism. When the ambient temperature rises to the transition temperature, the length of the SMA mechanism rapidly changes to a second shorter length.

The housing 13 has a lower opening 47 and side openings 48 in addition to the upper opening 29 so that the ambient fluid in which the valve is immersed may flow through the housing and over the SMA mechanism 25. Thus, the SMA element 25 responds to ambient temperature conditions. The ambient fluid may be the atmosphere surrounding the valve 1 or a liquid or gas in an enclosure or tank (not shown) in which the valve is installed.

When the ambient temperature is below the transition temperature, the SMA mechanism 25 assumes the first, longer length as shown in FIG. 1A. Under these conditions, the lever arm 37 rests against a stop pin 49 secured in the housing 13. Feet 51 on the legs 45 of the yoke 11 are spaced frown the collar 23 on the valve stem 7 by a gap, so that the spring 21 can bias the valve 1 to the fully closed position.

Figure 3:
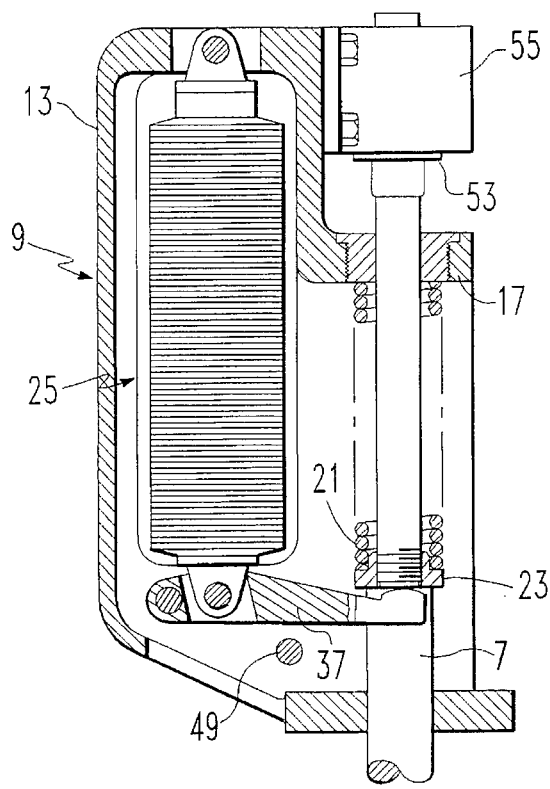
FIG. 3 is a view similar to that of FIG. 1A showing the valve actuated to the open position.

When an increase in ambient temperature raises the temperature of the SMA mechanism 25 to its transition temperature, the SMA mechanism 25 rapidly shrinks to its second, shorter length as shown in FIG. 3. In doing so, it rotates the lever arm 37 to close the gap between shoes 51 and the collar 23, and then to lift the collar 23, thereby raising the valve stem 7 and compressing the spring 21. In some installations, it is desirable to have the valve remain in the actuated (the open position in the exemplary valve) even though the ambient temperature falls below the transition temperature of the SMA mechanism 25. Thus, a latch coupling 53 is provided on the upper end of the valve stem 7 and engages the latch 55 to thereby hold the valve in the open position. When the ambient temperature falls below the transition temperature of the SMA mechanism 25, the mechanism transitions to the first, longer length shown in FIG. 1A, which rotates the lever arm clockwise until it engages the stop pin 49. With the valve stem 7 engaged by the latch 55, the valve remains in the open position. If the latch 55 is not provided, the spring 21 will close the valve when the temperature drops below the transition temperature.

Figure 4:
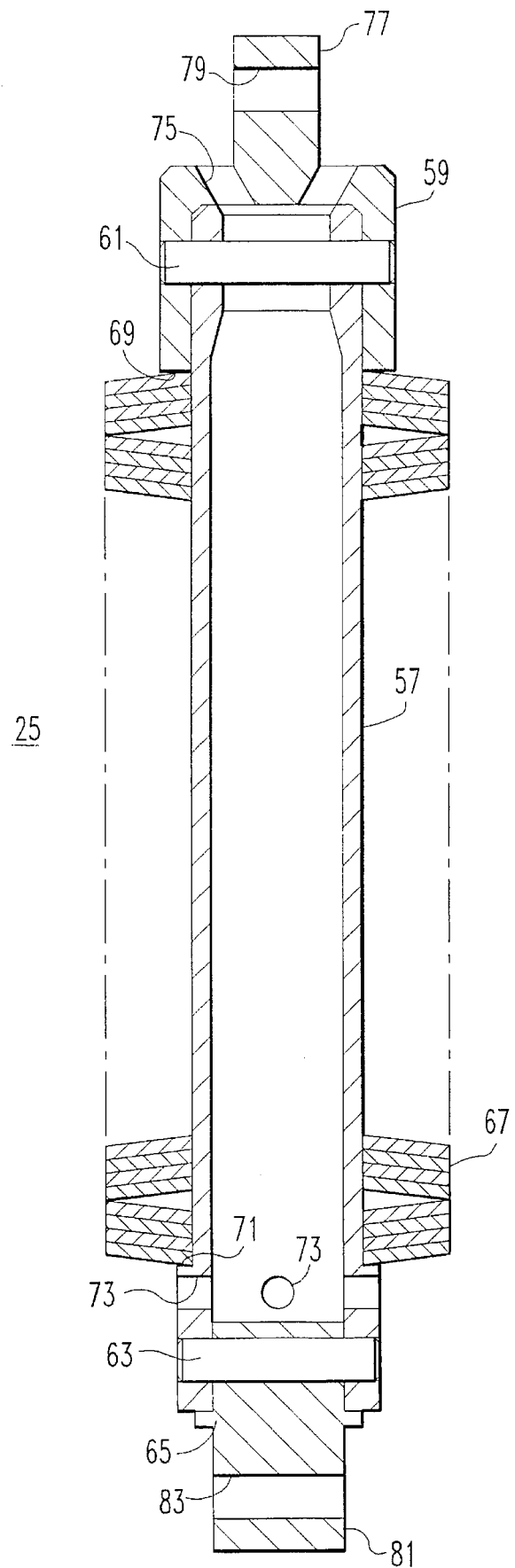
FIG. 4 is a vertical sectional view through one embodiment of a portion of the apparatus shown in FIG. 1A.

FIG. 4 illustrates a first, preferred embodiment of the SMA mechanism 25. The SMA mechanism 25 includes a tubular SMA member 57 made of a memory metal which can experience shape memory effect due to a thermal elastic martensitic transformation. The tubular SMA member 57 is secured to an upper coupling 59 by a transverse pin 61. Similarly, the lower end of the tubular SMA member 57 is secured by a pin 63 to a lower coupling 65. An SMA member biasing spring 67 is formed of a number of Bellville springs concentrically mounted on the tubular SMA member 57. The upper coupling 59 forms a shoulder 69 against which the upper end of the stack of Bellville springs 67 bears. The lower end of the stack of springs 67 seats on an annular shoulder 71 formed on the tubular SMA member 57. The biasing springs 67 extend the tubular SMA member 57 to its first longer position when the ambient temperature is below the transition temperature of the memory alloy. Ventilation holes 73 spaced around the lower end of the tubular SMA member 57 between the lower coupling 65 and the springs 67 together with circumferentially spaced apertures 75 in the upper coupling 59, permit ambient fluid to flow through the tubular SMA member 57 to thereby promote rapid response of the SMA mechanism 25 to changes in ambient temperature. The upper coupling 59 has a clevis 77 with a transverse bore 79 through which the pin 31 passes to pivotally secure the SMA mechanism 25 to the housing. The lower coupling 65 also has a clevis 81 with a transverse bore 83 through which the pivot pin 35 passes to connect the SMA mechanism 25 to the lower arm 37. The stop pin 49 limits the stretching of the tubular SMA member 57 by the springs 67 so that the elastic limit of the memory metal is not exceeded.

With the SMA mechanism 25 mounted in the housing 13, ambient fluid (air, gas, liquid) can circulate through the housing through the openings 29, 47 and 48, and then through the tubular SMA member 57 through the ventilation holes 73 and 75, so that the SMA actuator 9 responds to ambient temperature conditions.

Figure 5:
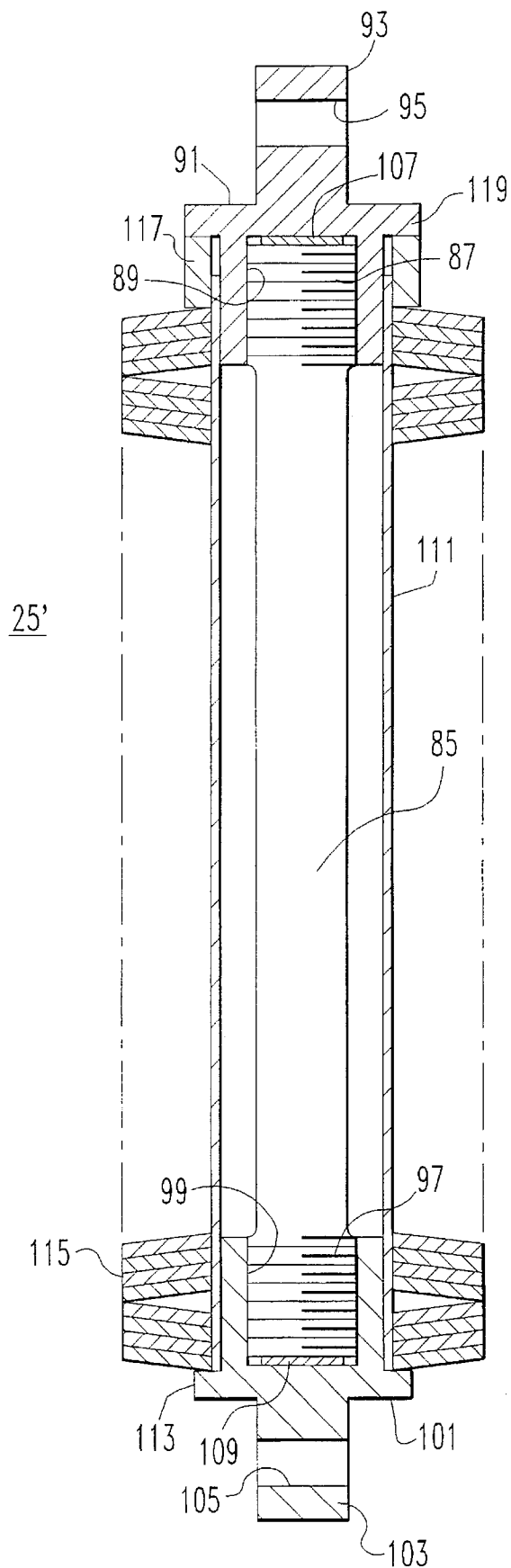
FIG. 5 is a vertical sectional view through another embodiment of the portion of the apparatus shown in FIG. 1A.

FIG. 5 illustrates an alternate embodiment of the SMA mechanism identified by the referenced character 25'. In this embodiment, the SMA member 85 is a solid rod of memory metal. The SMA member 85 has a threaded upper 87 which is threaded into a bore 89 in an upper coupling 91. The coupling 91 has a boss 93 with a bore 95 through which the pin 31 passes to pivotally connect the SMA member 85 to the housing 13.

Similarly, the threaded lower end 97 of the SMA member 85 is threaded into a bore 99 of a lower coupling 101. This lower coupling 101 has a boss 103 with a bore 105 through which the SMA member 85 is pivotally connected to the lever arm 37 by the pivot pin 35. Shims 107 and 109 provide adjustment so that the bores 95 and 105 are aligned in a common plane when the couplings 91 and 101 are screwed onto the SMA member 85.

A cylindrical sleeve 111 is concentrically mounted with the SMA element 85 and seats at its lower end against a radially outwardly extending flange 113 on the lower coupling 101. The cylindrical sleeve 111 concentrically supports an SMA member biasing spring 115, which is the exemplary SMA mechanism in a stack of Bellville springs. The upper end of the cylindrical sleeve 111 telescopes over the upper coupling 91. A ring 117 slides over the cylindrical sleeve 111 and bears against the upper end of the stack of biasing spring 115 and a radially outwardly extending flange 119 on the upper coupling 91 to preload the spring 115.

The tubular SMA member 57 illustrated in FIG. 4 is preferred over the solid rod SMA member 85 shown in FIG. 5 because it has a larger surface area exposed to the ambient fluid and a thinner wall thickness for faster response to changes in ambient conditions.

A suitable shape memory alloy for the passive actuator of the invention is a Tinel® Alloy K manufactured by Raychem Corporation. Alloy K is a ternary nickel-titanium alloy for high cycling applications. By way of example, it can provide an actuation temperature for use in containment in a nuclear reactor of 70° C. (158° F.) with a tolerance as small as +/−2° C. It allows low reset forces for strains up to p4%, and a narrow hysteresis of 25° C. from full austenite to full martensite. The temperature at which the Alloy K is reset to martensite is approximately 40° C. (104° F.). At temperatures below the martensitic transformation temperature, Tinel® alloys are martensitic, i.e., they are soft and can be deformed easily. At temperatures above the transformation temperature, the alloy recovers the original shape and returns to its high strength austenitic condition. The transformation between the austenite and martensite state does not occur at the same temperature on heating and cooling, and an alloy can be designed to either reduce the hysteresis to about 15° C. or extend it to over 100° C. Transformation temperatures in nickel-titanium alloys can be varied between −100° C. and +100° C. By way of example, the invention can be applied to a 10" globe valve having a required force on the valve plug of approximately 2000 lbs. and a stroke to fully open the valve of 1.5 inches. Using the embodiment of the SMA member shown in FIG. 3, a 10.5 inch long memory alloy tube 57 with a 2.0 inch outside diameter and 1.65 inch inside diameter when connected to a lever arm 37 having a 1:5 ratio of the distance between the pivot pins 35 and 41, and the distance between the shoes 51 and the pin 41 will yield a valve stem stroke of 1.5 inches with a strain of 3%. The same stress in the memory metal can be achieved with a rod 85 of 1.3 inches in diameter when the embodiment of FIG. 5 is utilized. The valve 1 will open when the ambient temperature exceeds 70° C. (158° F.). When the temperature falls below approximately 40° C. (104° F.), the SMA member 57, 85 will be expanded in a martensite state by a spring 67, 115 with a force of 15,000 lbs.

Figure 6:
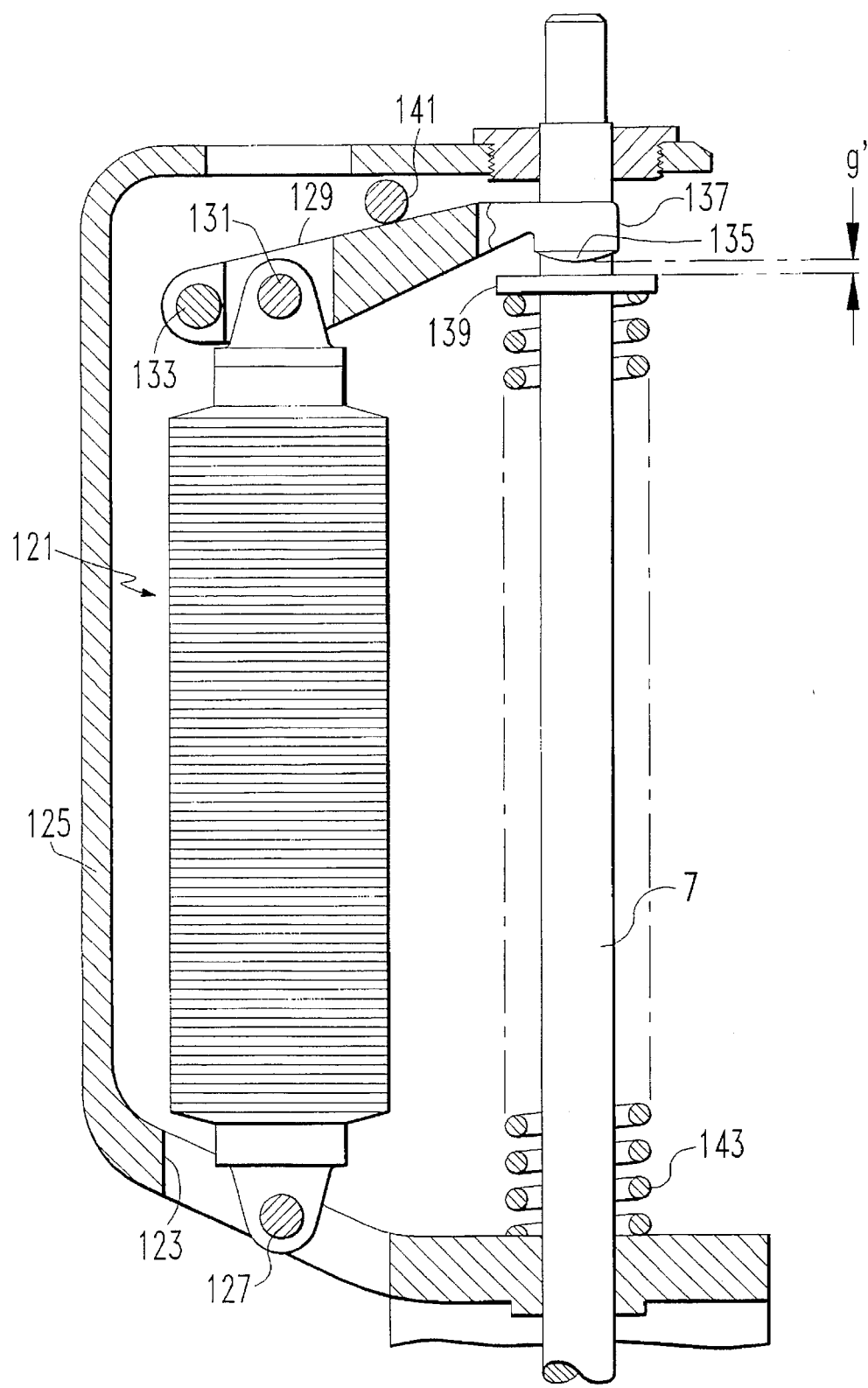
FIG. 6 is a vertical sectional view through yet another embodiment of the invention.

FIG. 6 illustrates application of the invention to closing of the valve 1 when the temperature exceeds the transition temperature. In this embodiment, the SMA mechanism 121 is similar to the mechanism 25, but is turned over so that the lower end is pivotally connected in an opening 123 in the housing 125 by pivot pin 127. The upper end of the SMA mechanism 121 is pinned to the lever arm 129 by pivot pin 131. The lever arm 129 is pivotally connected in the housing by the pin 133. The feet 135 on the bifurcated free end 137 of the lever arm 129 straddle the valve stem 7 and are spaced from the collar 139 on the valve stem 7 by the gap g' set by the position of the stop pin 141. The helical compression spring 143 biases the valve stem 7 upward to maintain the valve in an open position. The bushing 145 seated in the upper end of the housing 125 provides a guide for the upper end of the valve stem.

With the ambient temperature below the transition temperature of the SMA mechanism 121, the valve is held in the open position as shown in FIG. 6 by the spring 143. When the ambient temperature rises above the transition temperature of the SMA mechanism 121, the SMA mechanism shrinks in length to rotate the lever arm 129 in a clockwise direction, thereby closing the gap g', and then engaging the collar 139 to move the valve stem 7 downward thereby compressing the spring 143 and closing the valve. When the ambient temperature falls below the temperature at which the shape memory alloy of the SMA member 121 returns to the martensite state, the internal spring in the SMA mechanism 121 and the spring 143 return the components to their positions shown in FIG. 6. If desired, a latch can be provided as in the case of FIG. 3 to retain the valve in the closed position despite the transformation of the SMA mechanism to its martensite state.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A passively temperature actuated fluid valve in a fluid line, said valve having a shape memory alloy (SMA) actuator for passively actuating said valve in response to ambient temperature conditions, said valve having a valve stem which operates said valve between a first position and a second position, one of which is open and the other closed, and valve stem biasing means biasing said valve to said first position, and wherein said SMA actuator comprises an SMA mechanism coupled to said valve stem and having a transition temperature above which said SMA mechanism applies a force to said valve stem which operates said valve to said second position, said SMA mechanism being exposed to said ambient temperature conditions wherein said first position of said valve is said closed position, and wherein said SMA mechanism is coupled to said valve stem by a lost motion coupling arranged such that said SMA mechanism applies said force to said valve stem only when said ambient containment temperature is above said transition temperature.

2. A passively temperature actuated fluid valve in a fluid line, said valve having a shape memory alloy (SMA) actuator for passively actuating said valve in response to ambient temperature conditions, said valve having a valve stem which operates said valve between a first position and a second position, one of which is open and the other closed, and valve stem biasing means biasing said valve to said first position, and wherein said SMA actuator comprises an SMA mechanism coupled to said valve stem and having a transition temperature above which said SMA mechanism applies a force to said valve stem which operates said valve to said second position, said SMA mechanism being exposed to said ambient temperature conditions wherein said SMA mechanism comprises an elongated SMA member having a first length when below said transformation temperature and a second shorter length when above said transformation temperature, and wherein said elongated SMA member is coupled to said valve stem by a lever which is pivoted about a pivot axis as said elongated SMA member transitions between said first length and said second length.

3. The valve of claim 2 wherein said SMA actuator actuates said passively temperature actuated valve to an open position in response to an ambient temperature above a transition temperature of said SMA means.

4. The valve of claim 3 including latch means latching said valve in said actuated position.

5. The valve of claim 2 wherein said valve stem has a shoulder and said lever is spaced from said shoulder when said elongated SMA member is below said transformation temperature, but engages said shoulder on said valve stem and operates said valve to said second position as said elongated SMA member transitions from said first length to said second length as the ambient temperature rises above said transition temperature.

6. The valve of claim 2 having a housing and mounting means mounting said elongated SMA member generally parallel to said valve stem.

7. The valve of claim 6 wherein said mounting means includes thermal insulating means between said housing and said valve, said elongated SMA member being exposed to said ambient containment temperature.

8. The valve of claim 2 wherein said SMA mechanism includes SMA member biasing means biasing said elongated SMA member to said first length.

9. The valve of claim 8 including stop means limiting biasing of said elongated SMA member by said SMA member biasing means to said first length.

10. The valve of claim 9 wherein said SMA member biasing means comprises annular compression spring means concentric with and applying a tensile force to opposite ends of said elongated SMA member.

11. The valve of claim 2 wherein said elongated SMA member comprises an SMA rod.

12. The valve of claim 2 wherein said elongated SMA member comprises an SMA tube.

13. The valve of claim 12 wherein said annular compression spring means surrounds said SMA tube and said SMA mechanism further comprises flow passages through which ambient fluid circulates through such SMA tube.

14. A passively temperature actuated valve having a valve stem for operating said valve between a first position and a second position, valve biasing means biasing said valve to said first position, and passive actuation means comprising an elongated shape memory alloy (SMA) member having a first length when below a transformation temperature and a second length when above said transformation temperature, mounting means mounting said elongated SMA member to said valve, and a lever pivoted about a pivot axis generally transverse to said valve stem and elongated SMA member and engaging said valve stem to operate said valve from the first position to said second position as said elongated SMA member changes length from said first length to said second length, and SMA member biasing means biasing said elongated SMA member to said first length.

15. The valve of claim 14 wherein said mounting means further includes latch means latching said valve stem in said second position.

\* \* \* \* \*